United States Patent
Bakke

(10) Patent No.: US 6,439,305 B1
(45) Date of Patent: Aug. 27, 2002

(54) HYDRAULICALLY RELEASABLE COUPLING DEVICE

(75) Inventor: Stig Bakke, Ålgård (NO)

(73) Assignee: Bakke Technology AS, Algard (NO)

( * ) Notice: Subject to any disclaimer, the term of this patent is extended or adjusted under 35 U.S.C. 154(b) by 0 days.

(21) Appl. No.: 09/575,409

(22) Filed: May 19, 2000

(51) Int. Cl.⁷ ............................................. E21B 17/02
(52) U.S. Cl. .................................. 166/242.6; 166/383
(58) Field of Search .......................... 166/242.6, 242.7, 166/377, 383

(56) References Cited

U.S. PATENT DOCUMENTS

| 3,753,471 | A |   | 8/1973  | Kammerer, Jr. et al. |         |
|-----------|---|---|---------|----------------------|---------|
| 4,175,778 | A |   | 11/1979 | Nunez et al.         |         |
| 4,776,393 | A | * | 10/1988 | Forehane et al.      | 166/55.1 |
| 5,526,888 | A | * | 6/1996  | Gazewood             | 175/320 |
| 5,787,982 | A | * | 8/1998  | Bakke                | 166/242.6 |
| 6,196,325 | B1| * | 3/2001  | Connell et al.       | 166/377 |
| 6,213,206 | B1| * | 4/2001  | Bakke                | 166/242.7 |

FOREIGN PATENT DOCUMENTS

WO    WO 97/29270    8/1997

* cited by examiner

Primary Examiner—David Bagnell
Assistant Examiner—Jennifer R. Dougherty
(74) Attorney, Agent, or Firm—Knobbe Martens Olson & Bear LLP

(57) ABSTRACT

A hydraulically releasable coupling device has an upstream part arranged to permit connection to tubing and a downstream part arranged to be connected to a tool or equipment. A radially expandable locking ring is configured to expand and thereby to disconnect the coupling device. A movable securing ring portion encloses the locking ring at least partially in an unexpanded locking position thereof. A piston body is connected to the securing ring portion and has a through passage which is provided downstream with a restriction element. The piston body has an upstream piston head with an annular upstream reaction surface and an annular downstream reaction surface for pressure fluid in counterflow. The piston head has a larger diameter than a downstream extension formed as a piston skirt, in which the restriction element is mounted. A longitudinal portion of the piston skirt, next to the piston head, is enclosed by a cylinder chamber of the piston head accommodating a return spring.

5 Claims, 3 Drawing Sheets

HYDRAULICALLY RELEASABLE COUPLING DEVICE

FIELD

This invention relates to a hydraulically releasable coupling device which serves to connect, releasably, coiled tubing and a subsea tool/subsea equipment etc., which coupling device exhibits an elongate body between two end coupling elements of the type with threaded pipe tan end and internally threaded pipe socket end, and which has a preferably central through bore, so that the body allows flow-through of drilling mud and other fluid, and comprises two sleeve-shaped parts held together by means of releasable locking/blocking means, whose blocking effect may be brought to an end through intentional hydraulic release of the coupling device comprising a radially expandable locking ring, which normally prevents relative movement of the sleeve-shaped parts of the elongate body of the coupling device.

BACKGROUND

The Norwegian publication No. 180 552 discloses a hydraulically releasable coupling device of the kind initially mentioned, wherein two end pieces are connected by said radially expandable locking ring, in its normal operative position (in which release/disconnection is not relevant), being engaged in grooves in a securing sleeve incorporated in the coupling device. An axially displaceable securing sleeve encloses the locking ring by its one end portion, and prevents it from expanding radially, thereby unintentionally causing tools to be released and disconnected from the coiled tubing. An intentional release, which is brought about hydraulically, is only to be effected if the tool has become jammed and is immovably stuck.

By the known coupling device according to Norwegian publication No. 180.552, said securing sleeve is retained by means of shear pins until release is desirable or necessary. When the coupling device is to be released hydraulically, a ball-like sealing body is positioned, in a manner known in itself, on an internal seat of a piston sleeve included in the coupling device, so that fluid flow through the tubular coupling device is prevented, and pressure builds up upstream of the sealing body. Increasing hydraulic force acting on the sealing body and the seat-carrying piston sleeve, forces the piston sleeve against the securing sleeve so that the shear pins break, and the securing sleeve is displaced, whereby it no longer encloses the locking ring. Said grooves of the securing sleeve are provided with sloping flanks, and the axial force acting on the locking ring through the through passage of the coupling device, gives rise, due to said slope, to a radial force, which brings the locking ring to expand radially and release the locking sleeve.

By the release of such a hydraulically activatable coupling device, it is divided into at least two separate parts, one of which is securely connected to the tool/equipment which has become stuck at the point of its operations, whereas the second part is firmly screwed to the end of the coiled tubing and follows this on the hauling thereof into a surface position. Later is decided whether the tool/equipment should be retrieved, drilled to pieces where it is or similar, but this is not an object of the present invention and is consequently not described in further detail.

The above mentioned, known hydraulically releasable coupling device comprises a constructively rather complex structure of quite a few movable parts. However, this drawback is fairly limited relative to the tendency of releasing on the occurrence of high fluid pressures, which can occur suddenly.

This fluid-pressure-dependent undesirable tendency of this known coupling device is the more disadvantageous, considered on the basis that in down-hole operations it is often desirable to work by high fluid pressure. Of course, this needs to be carried out without the risk that the coupling device releases, and the elongate sleeve-shaped body is divided into two separate parts, of which only one can follow the coiled tubing up in a highly undesirable interruption of operation/hauling operation, whereby the tool/equipment itself remains in the downhole position in which the work operations were unintentionally interrupted by a hydraulic releasing (high fluid pressure) of the coupling device. The tool/equipment may be retrieved by a so-called fishing operation, or it may be drilled through and rendered harmless in its position downhole.

Before work operations are resumed after such unpredicted undesirable interruptions, valuable time has normally been lost.

SUMMARY

In one embodiment, the invention comprises a hydraulically releasable coupling device including an upstream part arranged to permit connection to tubing and a downstream part arranged to be connected to a tool or equipment. The coupling device also includes a radially expandable locking ring configured to expand and thereby to disconnect the coupling device, a movable securing ring portion enclosing the locking ring at least partially in an unexpanded locking position thereof; and a piston body connected to the securing ring portion and having a through passage which is provided downstream with a restriction element.

DETAILED DESCRIPTION

Figure 1:
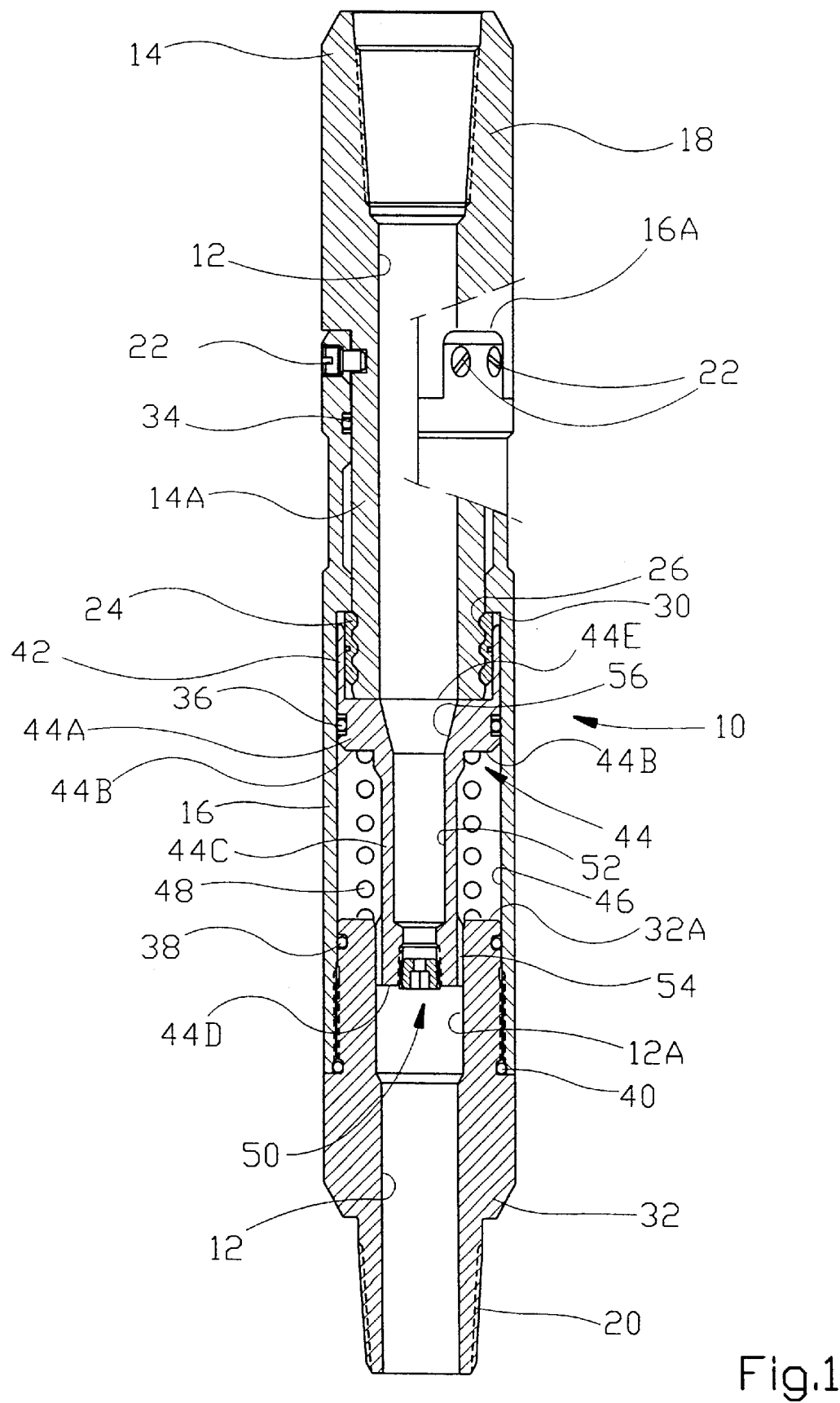
FIG. 1 illustrates a coupling device in accordance with one embodiment of the invention in the coupled position.

Thus, the invention is to make it possible to maintain fluid circulation at a very high pressure through the hydraulically releasable coupling device, without a releasing thereof. Immediately prior to intentional release, in connection with the tool/equipment having become jammed in its operating downhole position, and having become immovably stuck in the formation, which is being worked, the amount of fluid flowing through the coupling device per time unit (velocity of flow/flow rate), is increased. It is only this conscious action that causes the release of the coupling device according to the invention. At any time, during normal downhole work operations, one may operate by high pressure combined with a small/moderate amount of fluid flowing through an internal restriction (choked passage, choke valve) per time unit (the velocity of flow/flow rate), which forms an important feature of the present invention.

The restriction is formed centrally in the downstream end of a slide/piston arranged axially displaceable, whereby the outer sealing surface of the piston head rests slidably by its circumference on the inner surface of a cylinder-shaped chamber, which is defined internally by the sleeve wall of a first sleeve-shaped part of the coupling device, and which forms, together with an elongate narrower part of the piston downstream of the piston head, an annulus, in which is arranged a return spring in the form of a helically shaped compression spring inserted between a shoulder surface on the piston head and an opposite end surface on a coupling piece (threaded tubular pin) for the tool/equipment which is screwed to the first sleeve-shaped part of the coupling device and subsequently forming a unit therewith.

The radially expandable locking ring which has internal, annular, radial projections with intermediate grooves of a corresponding course, essentially matchingly engages, by its annular projections, corresponding grooves formed in the adjacent, opposite outer surface layer of a second sleeve-shaped part of the coupling device, whereas the one end surface (the upstream end) of this profiled locking ring rests blockingly on an annular shoulder, which is formed internally on the first sleeve-shaped part of the coupling device.

The coupling is secured in this connected, non-released position by means of radially oriented shear pins, engaged through each of the two sleeve-shaped parts in an area, where these overlap one another in the direction of the axis of the coupling device.

The two concentric sleeve-shaped parts of the coupling device, overlapping each other in an axial region, where the shear pins and the locking ring are spaced apart suitably, counted in the longitudinal direction, exhibit different longitudinal sections or portions differing in outer and/or inner diameters, in order to, among other things, co-operatively define or form for example said annulus for the accommodation of the return spring of the piston, and for the reception of a certain amount of circulating fluid through axial through channels, which extend in the intact condition of the coupling device, along the exterior of the downstream portion of the piston skirt, i.e. in the region of said restriction. These communication channels are enclosed by an upstream, sleeve-shaped portion of the internal wall surface of the above mentioned tool/equipment-coupling-piece, which is screwed, by and near the restriction, to the downstream end portion of the adjacent sleeve-shaped part.

Upstream, the piston head has an annular wall with a free terminating edge, and the outer wall surface is flush with the outer surface of the piston head, which is provided with a 360° annular groove for a sealing element in the form of an O-ring, bearing sealingly on the inner surface of said cylinder-shaped chamber defined by the adjacent sleeve-shaped part of the coupling device.

The annular upstream wall of the piston head with a free terminal edge is sized and positioned to enclose the radially expandable locking ring in the intact condition of the coupling device, so that if this annular securing wall portion of the piston head is displaced against the action of the return spring an axial distance approximately corresponding to the axial length of the locking ring, space is cleared for the radial expansion of the locking ring, namely inside the adjacent sleeve-shaped part of the coupling device (the downstream part), which finds itself with its upstream end in the overlap area of the shear pins, and is formed with its downstream end as an internally threaded sleeve portion which is screwed together with said tool-connecting piece.

The piston head has, circumferentially, an annular reaction surface, on which one end of the return spring is bearing, and on which pressure of hydraulic fluid may act axially through the restriction (choke opening, nozzle or similar) and said axial channels (together possibly forming one 360° very narrow annulus around the downstream end portion of the piston skirt), and counteract relative movement of the two concentric sleeve-shaped parts of the coupling device, partly overlapping one another telescopically.

If the tool/equipment (not shown) connected to the downstream coupling piece has to be released where it is, in its downhole position, in particular if it has become jammed and cannot be moved, an intentional disconnection of the sleeve-shaped part of the coupling device, screwed together with said coupling piece, is to be implemented, whereby the sleeve-shaped part connected to the end of the coiled tubing, is released together with the coiled tubing in its full length and in undamaged condition.

Attempts to haul a jammed tool loose, may result in the coiled tubing being torn at a random point, e.g. at a considerable distance above the point of the jammed tool, whereas, on the contrary, it is important to break the connection with the subsea tool/equipment as close to this as possible, to salvage all of the tubing in its intact condition, in full length.

In the case of a downhole jamming, in which the tool is immovably stuck in the subsea formation structure, a decision is made to release the coupling device and leave (at least temporarily) its one part and the jammed tool where they are.

To accomplish this, the amount of fluid flowing through the choke opening/nozzle (restriction) per time unit (the fluid flow rate) is increased. Then the fluid pressure will build up across the restriction and will then fairly soon assume such a value downstream, which overcomes the upstream forces acting on the sleeve-shaped piston (return spring, fluid pressure in the annulus enclosing the piston), so that the piston is brought into axially displacing downstream movement.

By a piston displacement distance approximately corresponding to the axial length of the radially expandable locking ring, the annular upstream portion of the piston with the free circumferential edge, which has so far acted as a blocking ring for the locking ring, and resisted the radial expansion thereof, has moved clear of the locking ring, which is then rendered free for radial expansion, which will correspond, in an diametrical cross-section, to twice the wall thickness of the upstream blocking ring portion of the piston.

Thereby the locking ring expands to take a radially expanded idle position, in which the fixing, matching engagement of its annular, internal projections with the complementary external grooves of the sleeve-shaped upstream part of the coupling device is brought to an end, while at the same time, the previously fixing abutment of the locking ring, by its upstream circumferential end, on an internal shoulder surface formed in the sleeve-shaped downstream part of the coupling device, becomes ineffective since the locking ring is no longer retained to the sleeve-shaped upstream part of the coupling device.

Accordingly, the locking ring has now been brought out of the connecting engagement with the two sleeve-shaped parts essentially included in the coupling device, together with the locking ring, piston, piston return spring and said downstream coupling piece. The two sleeve-shaped coupling parts are held together only by means of the shear pins. Through an intentional increase of the fluid pressure of fluid supplied to the restriction of the coupling device, the shear pins are brought to break, and the coupling device is ready to be divided, after which the coiled tubing may be hauled up with the sleeve-shaped upstream part connected to the end of the coiled tubing. Left in its position at the point downhole, for possible later retrieval, the tool stays connected to the sleeve-shaped downstream part of the coupling device through said coupling piece, enclosing the locking ring, piston, return spring and seals in the form of O-rings.

Figure 2:
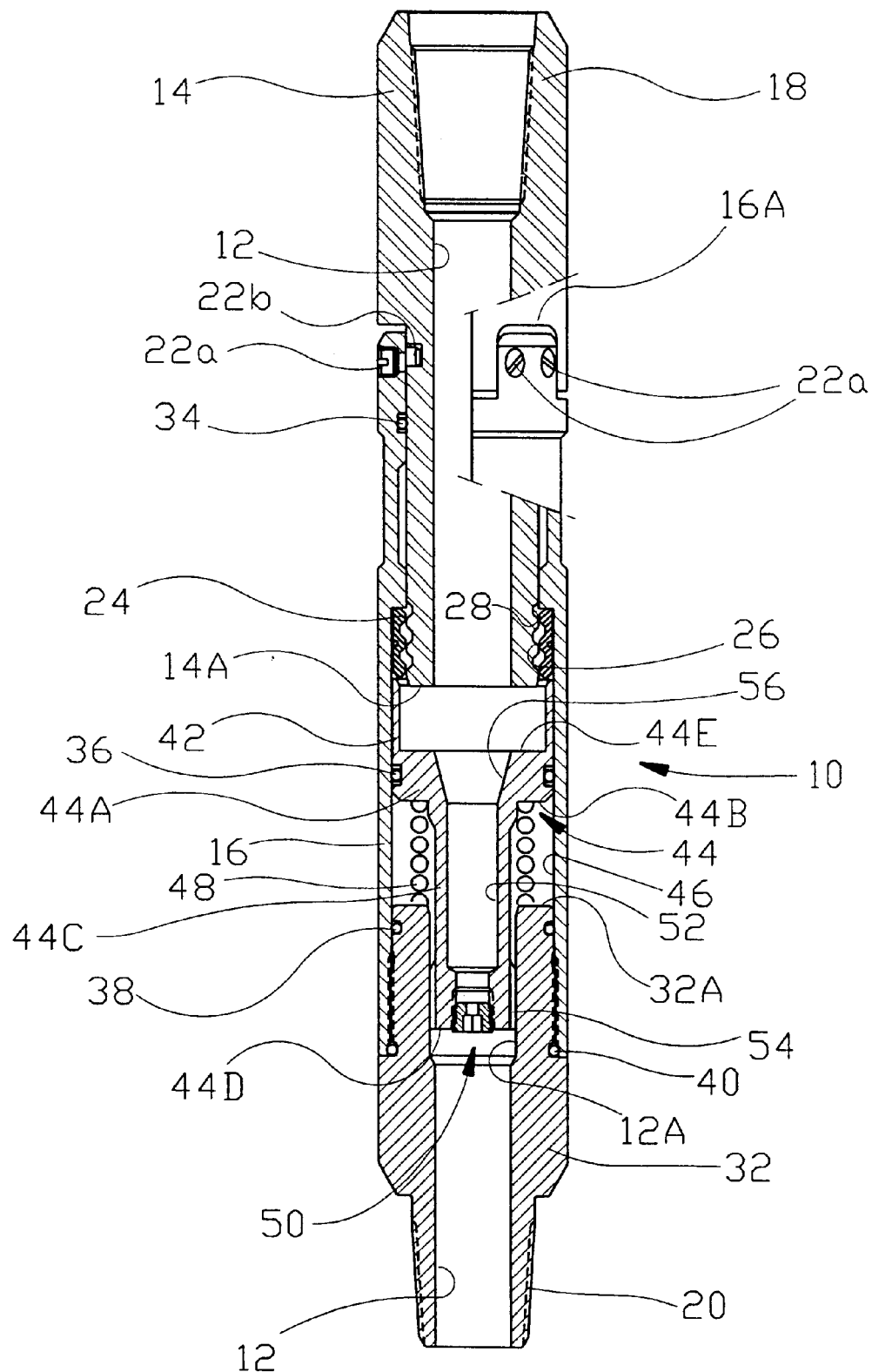
FIG. 2 illustrates the coupling device of FIG. 1 in the just released position.
Figure 3:
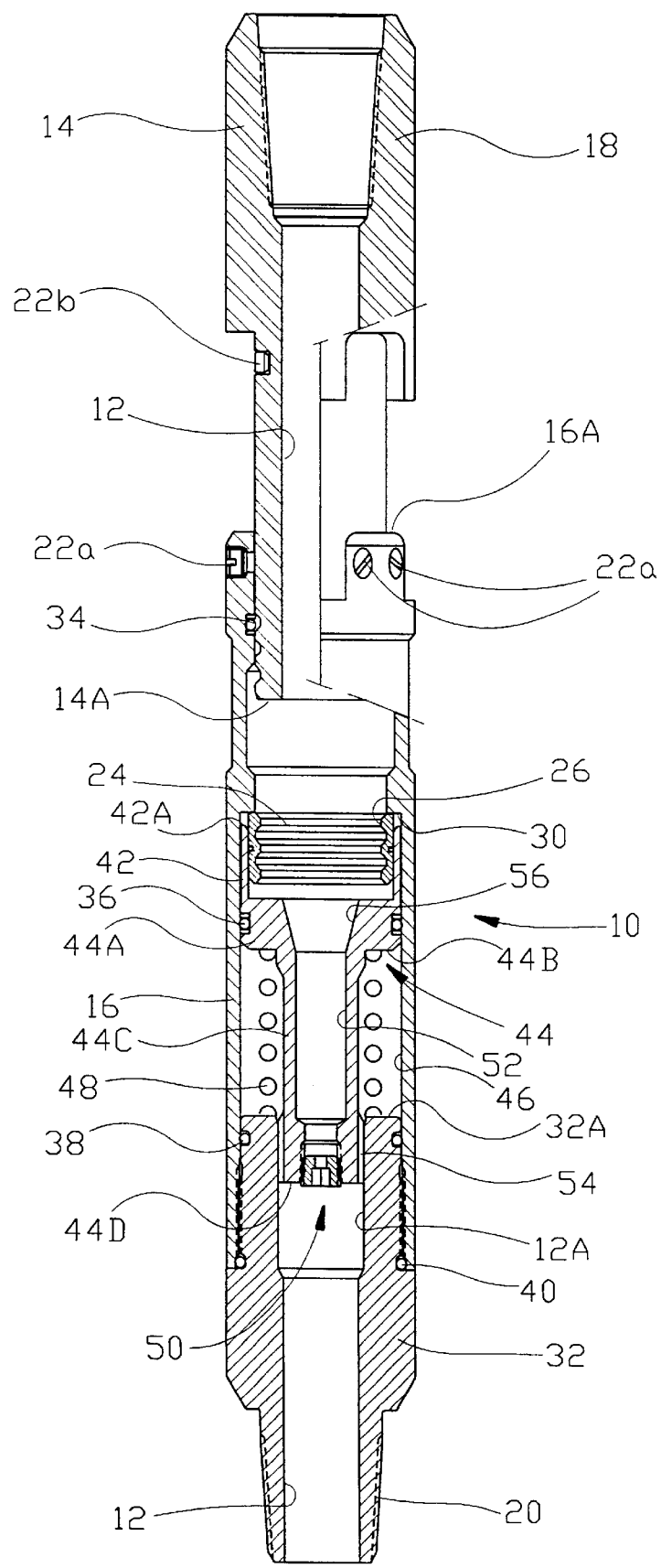
FIG. 3 illustrates the coupling device of FIGS. 1 and 2 in the nearly uncoupled position.

A non-limiting example of a present preferred embodiment illustrative of the basic principle of the invention, will be explained in further detail in the following, with reference to the accompanying drawings, in which each of the three figures shows an elongate coupling device with a through passage for fluid, in an axially sectional view, apart from a short half longitudinal section, in which shear pins and adjacent outer surface portions are shown in a side view. FIGS. 1–3 show different parts of the coupling device in positions differing from one another, wherein:

FIG. 1 shows the coupling device in its active, connected position, in which the two concentric sleeve-shaped parts overlap one another telescopically in the area where the shear pins and an expandable locking ring ensure that the parts are held together;

FIG. 2 corresponds to FIG. 1, but here is shown a situation in which the release of the coupling device has been started, and in which the locking ring has been allowed to expand radially and thus has reached its idle position, and in which the shear pins have just been brought to break;

FIG. 3 corresponds to FIG. 2, but here the situation is, that the sleeve-shaped upstream part of the coupling device, with which the not shown coiled tubing is screwed together, is about to slide off and become free of the sleeve-shaped downstream part of the coupling device, to which the tool has been screwed securely.

An elongate coupling device 10 has a through fluid passage 12 of varying cross sectional areas, distributed along the length of the coupling device 10. Also the exterior of the coupling device has longitudinal portions of different diameters. Only internal or external longitudinal sections of different diameters, shoulder formations or sloping/conical surface portions of functional importance to the present invention, will be explained in further detail. Configurations of the same or similar kind, favourable to the production, are of no importance in this connection, and will not be described.

The elongate, tubular coupling device 10 is meant to be fitted coaxially between the outer free connecting end of coiled tubing (not shown) and a tool (not shown).

To this end the coupling device 10 comprises two concentric sleeve-shaped parts 14 and 16, an upstream part 14 with an internally threaded box portion 18 for the connection of the end of the coil tubing by screwing, and a downstream part 16 with a threaded pin element 20 for the connection of the tool by screwing.

The upstream and downstream parts 14 and 16 of the coupling device 10 overlap telescopically over a fairly considerable longitudinal portion of the length of the coupling device 10.

Within this overlap area are arranged shear pins 22 distributed circumferentially and in engagement through the sleeve walls of the two parts 14, 16.

Within the same overlap area is arranged a radially expandable locking ring 24, which has been illustrated and explained in detail in the Norwegian publication 180552.

The locking ring 24 which may consist, in a manner known in itself, of a number of segments which are distributed along the circumference of the locking ring and extending in the full axial extent of the locking ring, has axial edge formations, which engage one another matchingly with radial movability, to allow radial expansion of the locking ring when an enclosing securing sleeve or similar, preventing such expansion, is withdrawn in connection with the releasing of the coupling device.

In another embodiment the locking ring may consist of a split resilient ring of a corresponding function, i.e. with the possibility of radial expansion, resisted in the normal condition of the coupling device.

Each of these exemplary embodiments has internal annular, radial inward projections in the form of coarse splines 26 with intermediate, largely complementary circumferential grooves. In the unexpanded active locking position of the locking ring 24, FIG. 1, the splines 26 matchingly engage, in a blocking manner, corresponding grooves 28, FIG. 2.

The upstream end surface of the locking ring 24 abuts an internal annular shoulder surface 30, FIG. 3. In this position, which is the locking position of the locking ring 24, it efficiently resists relative axial displacement of the sleeve-shaped upstream end 14 of the coupling device 10 and the sleeve-shaped downstream part 16 thereof.

In the embodiment shown, the hydraulically releasable coupling device 10 is provided with a particular coupling piece 32, carrying the pin-shaped connecting means 20 and screwed by an externally threaded end portion opposite the means 20 firmly into an internally threaded end portion of the sleeve-shaped downstream part 16.

Along the inside of the downstream part 16 seals in the form of O-rings 34, 36, 38 and 40 or similar high quality seals are inserted in annular grooves, to ensure, thereby, a high degree of tightening laterally within the coupling device and between relatively movable parts.

In its normal connected condition, FIG. 1, i.e. when the locking ring 24 through its co-operation with the internal shoulder surface 30 facing downstream and formed in the downstream part 16 of the coupling device 10 at an axial distance from the downstream end 14A of the sleeve-shaped upstream part 14, approximately corresponding to the axial length of the locking ring 24, and through its co-operation with the annular coarse grooves 28 of the upstream part 14 by its broad splines 26, the locking ring 24 is surrounded by an annular wall portion 42, which has a free edge 42A facing the box-shaped upstream connecting end 18 of the coupling device 10.

As earlier explained, such an annular enclosing wall or similar configuration should prevent the radial expansion of the locking ring 24, when normal coupling conditions are to be maintained. Therefore, it is an advantage that in this locking position the locking ring 24 is positioned within a longitudinal portion of the sleeve wall of the downstream part, immediately enclosing the exterior of said annular wall 42.

In accordance with the present invention, this securing ring 42 is carried by a piston body 44 with a wide piston head 44A, which is axially displaceable within a cylinder 46 defined by a longitudinal portion of the inner wall surface of the sleeve-shaped downstream part 16 of the coupling device 10, the upstream end surface of the coupling piece 32 and said internal, annular shoulder surface 34. A return spring for the hollow piston body 44 is identified by 48 and has the form of a helical compression spring, inserted between the upstream end surface of the coupling piece 32 and an opposite, annular reaction surface 44B on the piston head 44A.

The piston head 44A is continued by a piston skirt 44C, the axial length of which exceeds the length of the cylinder chamber 46, and which is downstream provided with a restriction means 50 in the form of any means which may be inserted to narrow the fluid flow through the through passage 52 of the hollow piston body 44.

Examples of such restriction means are nozzles and choke valves/choking mouth pieces.

In the normal connecting condition of the coupling device 10, FIG. 1, the through bore 12 of the coupling device 10, downstream of the restriction means 50 of the valve body 44, is in liquid/fluid communication with the cylinder chamber 46 of the piston head 44A. For this purpose, between the downstream end 44D of the piston skirt 44C and the upstream end 32A of the coupling piece 32, is formed an annulus 54, which may be replaced by axial through channels, suitably distributed circumferentially. In the embodiment with an annulus it is the simplest to form a longitudinal section 12A of the through bore 12 of the coupling device 10 with a somewhat larger internal diameter than the outer diameter of the piston skirt 44C.

Upstream, in the area of the piston head 44A, the through passage 52 of the piston body 44 has an expansion 56 narrowing conically downstream.

In normal downhole operations the relatively movable parts of the coupling device 10 take the positions appearing from FIG. 1, in which the two separable connected pieces 14 and 16 of the device 10 are secured in their positions blocked by the locking ring 24, by means of the securing portion 42 of the piston 44, which through its dimension and position around the locking ring 24, resists unintentional expansion of the locking ring 24 into its idle position (FIG. 2), in which its locking effect has come to an end, the coupling device having, as an extra retaining measure, shear pins 22 (shorn shear pins are illustrated as such and the pieces are identified by 22a and 22b).

As earlier mentioned, fluid (drilling mud; hydraulic fluid) may be circulated through the coupling device 10 at high pressure, as long as provision is made to keep the velocity of the flow-through of fluid low/moderate.

The primary reaction surface of the piston 44 is annular and identified by 44E, FIG. 2, but in the normal connecting position of the coupling device 10, FIG. 1, it is covered, i.e. partly by the downstream end surface 14A of the sleeve-shaped upstream part 14, partly by the cross-section of the locking ring 24, which fills the annulus between the external surface of the upstream part 14 and the internal surface of the securing ring portion 42 upstream of said reaction surface 44E, FIG. 2.

One of the reasons why the coupling device 10 according to the invention can work at high fluid pressure (low amount of circulation fluid per time unit) is the possibility of letting the "opposite" reaction surface 44B of the piston head be influenced by pressure from fluid passing through the choked opening/nozzle 50 in counter-flow through the fluid communication passage 54 into the cylinder chamber 46 for the piston head 44A.

When the decision has been made, that the coupling device 10 should be divided, so that its upstream part 14 may follow the connected intact coiled tubing up to the surface, whereas the rest of the coupling device 10 plus special tools are left where they are in the downhole position (for possible later retrieval), the amount of fluid supplied per time unit to the coupling device 10 is increased, and this causes a pressure build-up across the restriction means.

The pressure will then build up across the restriction means 50, which forms a unit with the piston body 44, so that the unit 44,50 at a certain elevated pressure value will be pushed downstream. Once the upstream annular reaction surface 44E of the piston head 44A is exposed and is at an axial distance from the downstream end surface 14A of the sleeve-shaped upstream part 14, the piston head may also take part in the downstream displacement during the initial release phase of the coupling device 10.

During this axial displacement of the piston 44, it carries along the securing portion 42, integral therewith, which by a distance of displacement approximately corresponding to the axial length of the locking ring 24, releases the locking ring 24 for radial expansion, FIG. 2. The function of the securing ring 42 has thereby, at least temporarily, come to an end.

By the expansion in the radial direction, the internal, annular coarse splines 26 of the locking ring 24 completely disengage the external grooves 28 of the sleeve-shaped upstream part 14 of the coupling part 10. The locking effect of the locking ring 24 is over, and the parts 14 and 16 are now held together exclusively by means of the shear pins 26 forming the extra securing measure.

By continued increase of the pressure, the shear pins 26 are caused to break (22a identifies one part of a shear pin, 22b the other part), and the coupling device 10 will be divided as suggested in FIG. 3. In the situation according to FIG. 3 the fluid pressure supplied is reduced, and the return spring 48 has brought back the piston 44 with the securing ring portion 42, but the locking ring 24, which is again surrounded by the securing ring portion 42 of the piston 44, is no longer in any kind of engagement with the upstream part 14 of the coupling device 10. From the released position shown in FIG. 3, it only remains to pull the upstream part 14 (the downstream part 16 is assumed to be stuck in a downhole position, and is moreover not connected to the coiled tubing/drill string which runs up to a surface position), unobstructed, a short remaining distance out of the sleeve-shaped upstream portion of the downstream part 16 of the coupling device 10, until the end surfaces 14A and 16A become clear of one another.

What is claimed is:

1. A hydraulically releasable coupling device, comprising:
    an upstream part arranged to permit connection to tubing;
    a downstream part arranged to be connected to a tool or equipment;
    a radially expandable locking ring configured to expand and thereby to disconnect the coupling device;
    a movable securing ring portion enclosing the locking ring at least partially in an unexpanded locking position thereof; and
    a piston body connected to the securing ring portion and having a through passage which is provided downstream with a restriction element, wherein the piston body has an upstream piston head with an annular upstream reaction surface and an annular downstream reaction surface for pressure fluid in counterflow, the piston head, has a larger diameter than a downstream extension formed as a piston skirt, in which the restriction element is mounted, and wherein a longitudinal portion of the piston skirt, next to the piston head, is enclosed by a cylinder chamber of the piston head accommodating a return spring.

2. The couplng device of claim 1, wherein opposite reaction surfaces of the piston head essentially correspond to one another in area.

3. The coupling device of claim 1, wherein a fluid communication exists into the cylinder chamber of the piston head accommodating the return spring, the fluid communication extending from a through bore of the coupling device from a point immediately downstream of the restriction element of the piston body.

4. The coupling device of claim 1, wherein a downstream end surface of a sleeve-shaped upstream part of the coupling device has a width and is positioned so that together with the locking ring, in a non-released condition of the coupling device, it covers an annular reaction surface of the piston head opposite the normal fluid flow direction, and prevents the piston from being influenced by the pressure of the flowing fluid.

5. A hydraulically releasable coupling device for use as an intermediate piece between a coiled tubing and a subsea tool or accessory formed as an elongate body having a through bore and comprising at least two interconnected, substantially concentric sleeve-shaped parts telescopically disposed, one within the other, to overlap each other along a predetermined longitudinal portion of said coupling device and, within a longitudinally extending area of overlap, said sleeve-shaped parts, which comprise an upstream sleeve-shaped part adapted to connect to said coiled tubing and a downstream part adapted to connect to said tool or accessory are connected and interlocked by means of an unexpanded, radially expandable locking ring having a locking effect that is configured to be brought to an end by causing the locking ring to expand radially and thereby disconnect, from one another, said sleeve-shaped parts of the coupling device together with shear-pin penetrating opposite sleeve walls, wherein a securing sleeve or ring portion is movable upon the occurrence of an intentional release operation enclosing the locking ring at least partially in an unexpanded locking position thereof, said securing ring portion being connected to a piston body having a through passage which is in a downstream direction provided with a restriction means in form of a nozzle or a choke valve or a choked opening, said tool or accessory being adapted to be in a position operating at high fluid pressures when combined with a through-flowing amount of fluid of moderate value passing through per time unit, said piston body having an upstream piston head with an annular upstream reaction surface and an annular downstream reaction surface for pressure fluid in counterflow, the piston head exhibiting a larger diameter than a downstream extension formed as a piston skirt, in which a restriction element is mounted, wherein a longitudinal portion of said piston skirt, next to the piston head, is enclosed by a cylinder chamber of the piston head accommodating a return spring.

\* \* \* \* \*